US009853532B2

(12) United States Patent
Ionel et al.

(10) Patent No.: US 9,853,532 B2
(45) Date of Patent: Dec. 26, 2017

(54) MAGNETIC TRANSMISSION

(75) Inventors: Dan M. Ionel, Fox Point, WI (US);
Alan E. Lesak, Scotts Hill, TN (US);
Ian P. Brown, Chicago, IL (US)

(73) Assignee: Regal Beloit America, Inc., Beloit, WI (US)

( * ) Notice: Subject to any disclaimer, the term of this patent is extended or adjusted under 35 U.S.C. 154(b) by 840 days.

(21) Appl. No.: 14/234,331

(22) PCT Filed: Jul. 20, 2012

(86) PCT No.: PCT/US2012/047521
§ 371 (c)(1),
(2), (4) Date: Mar. 4, 2014

(87) PCT Pub. No.: WO2013/016159
PCT Pub. Date: Jan. 31, 2013

(65) Prior Publication Data
US 2014/0232227 A1    Aug. 21, 2014

Related U.S. Application Data

(60) Provisional application No. 61/510,805, filed on Jul. 22, 2011.

(51) Int. Cl.
*H02K 49/00* (2006.01)
*H02K 7/20* (2006.01)
(Continued)

(52) U.S. Cl.
CPC ........... *H02K 49/06* (2013.01); *B60W 10/105* (2013.01); *H02K 49/102* (2013.01); *H02K 2213/09* (2013.01)

(58) Field of Classification Search
CPC ............................... H02K 49/00; H02K 49/11
(Continued)

(56) References Cited

U.S. PATENT DOCUMENTS 5,125,067 A * 6/1992 Erdman .................. F23N 3/082
318/400.2
5,497,041 A   3/1996 Kondoh et al.
(Continued)

FOREIGN PATENT DOCUMENTS

DE    102007025550         12/2008
DE    102007025550 A1 * 12/2008 ............. F02B 37/04
(Continued)

OTHER PUBLICATIONS

Hatch, G; Recent Developments in Permanent Magnet Gear Systems & Machines; Magnetics Conference 2010; Jan. 28, 2010; 30 pages.
(Continued)

*Primary Examiner* — Jose Gonzalez Quinones
(74) *Attorney, Agent, or Firm* — Michael Best & Friedrich LLP

(57) ABSTRACT

An electromagnetic transmission assembly. The electromagnetic transmission assembly includes a stator having a central axis and a plurality of selectively-energized electromagnetic poles. A first rotor assembly is rotatably supported for rotation about the central axis. The first rotor assembly including a first rotor shaft and a castellated rotor including a plurality of radially arranged ferromagnetic pole portions disposed in a housing. A second rotor assembly is rotatably supported for rotation about the central axis. The second rotor assembly includes a second rotor shaft and a permanent-magnet rotor. The first rotor assembly is at least partially magnetically coupled to the second rotor assembly when the plurality of electromagnetic poles are energized.

19 Claims, 10 Drawing Sheets

(51) Int. Cl.
*H02K 16/00* (2006.01)
*H02K 21/12* (2006.01)
*H02K 49/06* (2006.01)
*H02K 49/10* (2006.01)
*B60W 10/105* (2012.01)

(58) Field of Classification Search
USPC .......................... 310/103, 112, 114, 156.34
See application file for complete search history.

(56) References Cited

U.S. PATENT DOCUMENTS

| | | | |
|---|---|---|---|
| 5,631,511 | A | 5/1997 | Schulmann et al. |
| 6,047,456 | A | 4/2000 | Yao et al. |
| 6,788,022 | B2 | 9/2004 | Sopko et al. |
| 6,794,781 | B2 | 9/2004 | Razzell et al. |
| 7,034,500 | B2 | 4/2006 | Ionel |
| 7,459,816 | B2 | 12/2008 | Yang |
| 7,466,053 | B1 | 12/2008 | Radev |
| 7,481,283 | B2 | 1/2009 | McDonald et al. |
| 7,567,006 | B2 | 7/2009 | Ichiyama |
| 7,592,730 | B2 | 9/2009 | Han et al. |
| 2007/0186692 | A1 | 8/2007 | Waszak et al. |
| 2008/0211335 | A1* | 9/2008 | Abe ................ H02K 16/02 310/103 |
| 2010/0032952 | A1 | 2/2010 | Hatch et al. |
| 2012/0122629 | A1* | 5/2012 | Akutsu ............ B60K 6/445 477/3 |

FOREIGN PATENT DOCUMENTS

| | | |
|---|---|---|
| EP | 1843454 | 10/2007 |
| EP | 2020326 | 2/2009 |
| GB | 2437568 | 10/2007 |
| GB | 2457682 | 8/2009 |
| GB | 2468888 | 9/2010 |
| JP | 2002340046 | 11/2002 |
| WO | 2009087408 | 7/2009 |
| WO | 2009130456 | 10/2009 |
| WO | 2009138725 | 11/2009 |
| WO | 2010015300 | 2/2010 |
| WO | 2010075907 | 7/2010 |
| WO | 2010082893 | 7/2010 |
| WO | 2013016159 | 1/2013 |

OTHER PUBLICATIONS

Search Report and Written Opinion from the International Searching Authority for Application No. PCT/US2012/047521 dated Apr. 28, 2014 (10 pages).

Komiyama, Hiroki et al.; "Speed Control and Sensorless Force Control with Magnetic Gear," The 11th IEEE Industrial Electronics Society International Workshop on Advanced Motion Control Conference, Mar. 21-24, 2010.

Ikeda, T., et al.; "A Way to Improve Efficiency of Permanent-Magnet Magnetic Gears," Journal of the Magnetics Society of Japan, vol. 33, No. 2, 130-4 (5 pages).

Atallah, K., et al.; "A High-Performance Linear Magnetic Gear," Journal of Applied Physics, vol. 97, Issue 10, May 2005.

Hesmondhalgh, D.E., et al.; "A Multielement Magnetic Gear," Electric Power Applications, IEE Proceedings B; vol. 127, Issue 3, May 1980.

Tsurumoto, K., et al.; "A New Magnetic Gear Using Permanent Magnet," IEEE Transactions on Magnetics, vol. 23, Issue 5, Sep. 1987.

Rens, J., et al.; "A Novel Magnetic Harmonic Gear," IEEE International Electric Machines & Drives Conference IEMDC '07, pp. 698-703, May 3-5, 2007.

Tashiro, T.; "A Study of Optimum Design of Permanent Magnet Type Magnetic Gear," Record of Electrical and Communication Engineering Conversazione Tohoku University; vol. 77, No. 1, pp. 258-259, Sep. 2008.

Kyung-Ho Ha, et al.; "Design and Characteristic Analysis of Non-Contact Magnet Gear for Conveyor by Using Permanent Magnet," Conference Record of the 37th IAS Annual Meeting, 2002 IEEE Industry Applications Conference, vol. 3, 2002.

Kikuchi, S., et al.; "Design and Characteristics of a New Magnetic Worm Gear Using Permanent Magnet," IEEE Transactions of Magnetics, vol. 29, Issue 6; Nov. 1993.

Nagrial, M.H. et al.; "Design and Performance of a Magnetic Gear," 2000 IEE International Magnetics Conference Digests, Apr. 9-13, 2000.

Chau, K.T., et al.; "Design of a Magnetic-Geared Outer-Rotor Permanent-Magnet Brushless Motor for Electric Vehicle," IEEE Transactions on Magnetics, vol. 43, Issue 6, Jun. 2007.

Rasmussen, P.O., et al.; "Development of a High-Performance Magnetic Gear," IEEE Transactions of Industry Applications, vol. 41, Issue 3, May-Jun. 2005.

Wang, L.L., et al.; "Development of a Magnetic-Geared Permanent-Magnet Brushless Motor," IEEE Transactions on Magnetics, vol. 45, No. 10, Oct. 2009.

Recent Developments in Permanent Magnet Gear Systems and Machines, http://www.dextermag.com, Jan. 28, 2010, 30 pages.

Ikuta, K., et al.; "Non-contact Magnetic Gear for Micro Transmission Mechanism," IEEE Micro Electro Mechanical Systems Proceedings, Jan. 2-Feb. 2, 1991.

Tsurumoto, K., et al.; "Prototype Production of New Magnetic Planetary and Differential Gears and Performance Characteristics Test," Journal of the Magnetics Society of Japan, vol. 26, No. 4, 2002 (4 pages).

\* cited by examiner

MAGNETIC TRANSMISSION

CROSS-REFERENCE TO RELATED APPLICATIONS

This patent application is a national stage filing under 35 U.S.C. 371 of International Application No. PCT/US2012/04752, filed Jul. 20, 2012, which claims priority benefits to U.S. Provisional Application No. 61/510,805, filed Jul. 22, 2011. These applications are incorporated herein by reference in their entirety.

BACKGROUND

The present invention relates to the transmission of power and torque.

More specifically, the invention relates to transmissions that change speed and torque between an input shaft and an output shaft. The variety of mechanical gear and transmission designs is extensive. However, mechanical gears and transmissions have a number of disadvantages including frictional wear, lubrication requirements, maintenance, and noise.

The use of magnetic or electromagnetic coupling can overcome several disadvantages of mechanical transmissions. For example, the frictional wear of mechanical gear teeth that mechanical transmissions may experience is substantially eliminated by magnetic coupling. The use of non-contact magnetic power transfer enables input and output shafts to be isolated and reduces maintenance schedule requirements. Furthermore, unlike mechanical transmissions with mechanical gear teeth, magnetic gears and transmissions have inherent, non-destructive overload protection.

SUMMARY

In one embodiment, the invention provides an electromagnetic transmission assembly. The electromagnetic transmission assembly includes a stator having a central axis and a plurality of selectively-energized electromagnetic poles. A first rotor assembly is rotatably supported for rotation about the central axis. The first rotor assembly including a first rotor shaft and a castellated rotor including a plurality of radially arranged ferromagnetic pole portions disposed in a housing. A second rotor assembly is rotatably supported for rotation about the central axis. The second rotor assembly includes a second rotor shaft and permanent-magnets mounted on or in the rotor. The first rotor assembly is at least partially magnetically coupled to the second rotor assembly when the plurality of electromagnetic poles are energized.

In another embodiment the invention provides a method of a selectively coupling a prime mover to a load. An electromagnetic transmission is provided. The transmission includes a stator having a central axis and a plurality of selectively-energized electromagnetic poles, a first rotor assembly rotatably supported for rotation about the central axis, the first rotor assembly and a second rotor assembly. A prime mover is coupled to one of the inner rotor and the outer rotor. A load is coupled to the other of the inner rotor and the outer rotor. The electromagnetic poles are selectively energized to create a magnetic field at least partially coupling the first rotor assembly and the second rotor assembly. The prime mover and load are operated in asynchronous driving relation. The electromagnetic poles are selectively deenergized, thereby substantially decoupling the first rotor assembly and the second rotor assembly such that prime mover operates substantially independent of the load.

Other aspects of the invention will become apparent by consideration of the detailed description and accompanying drawings.

DETAILED DESCRIPTION

Before any embodiments of the invention are explained in detail, it is to be understood that the invention is not limited in its application to the details of construction and the arrangement of components set forth in the following description or illustrated in the following drawings. The invention is capable of other embodiments and of being practiced or of being carried out in various ways.

Figure 1:
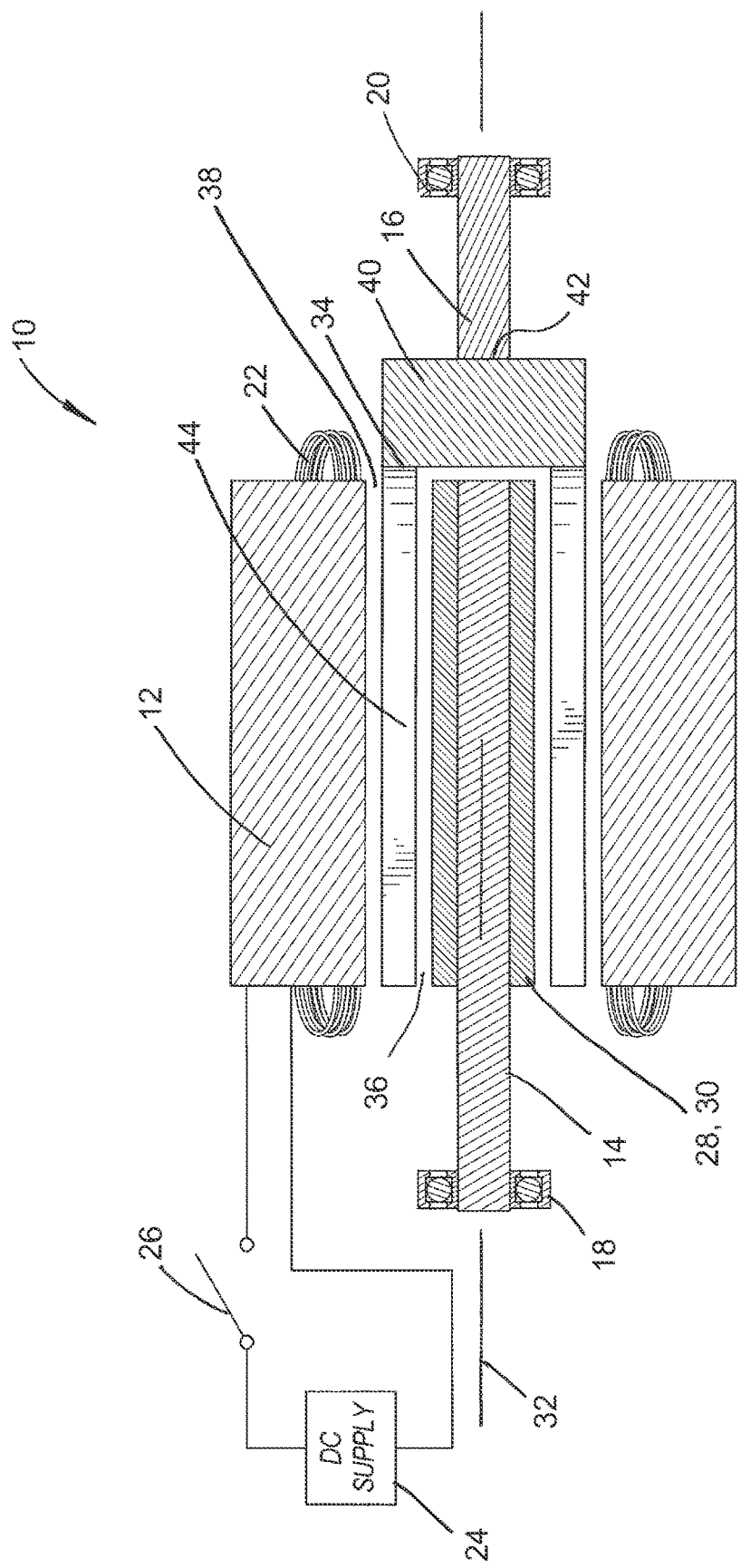
FIG. 1 is a cross-sectional view of an electromagnetic transmission according to a first aspect of the invention.

FIG. 1 is a cross-section of an electromagnetic transmission 10 according to a first aspect of the invention. The electromagnetic transmission 10 includes a stator 12, a first shaft 14, and a second shaft 16. The first shaft 14 is rotatably supported by a first bearing assembly 18, and the second shaft 16 is rotatably supported by a second bearing assembly 20.

The stator 12 includes a plurality of stator windings 22. A DC power supply 24 is selectively coupled to the stator windings 22 via a switch 26. The DC power supply 24 may be, for example, a battery, a capacitor, a rectifier, or other source of DC current. The switch 26 may be a mechanical, electric, or electronic device, as is known in the art.

Figure 4:
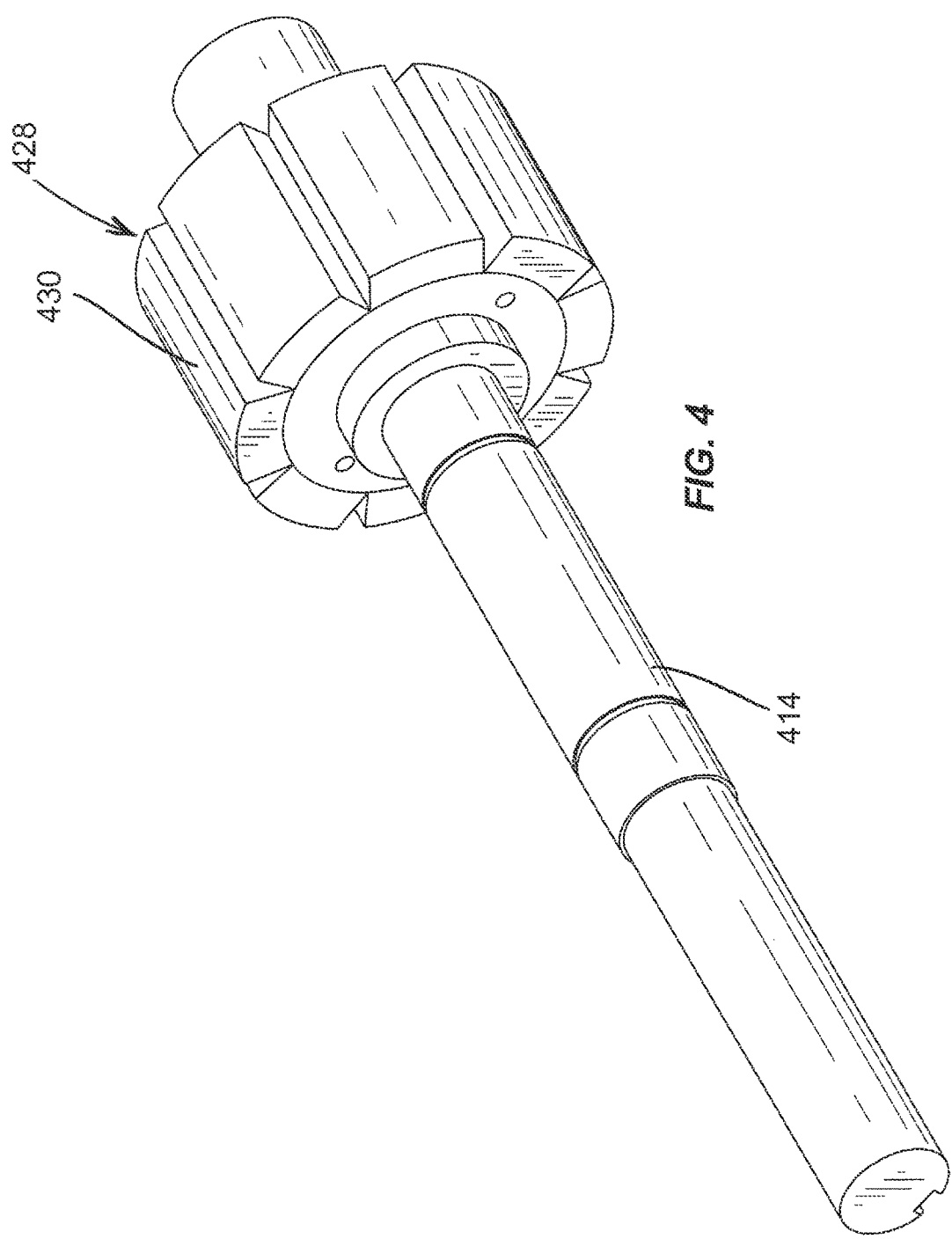
FIG. 4 is a perspective view of a portion of a shaft and inner rotor of an electromagnetic transmission.

An inner rotor 28 is coupled to the first shaft 14 such that the inner rotor 28 rotates synchronously with the first shaft 14. The inner rotor 28 includes a plurality of permanent magnets 30 arranged radially about a longitudinal axis 32 of the first shaft 14. An arrangement of this type is illustrated in FIG. 4 in a permanent magnet rotor 428 with radially arranged permanent magnets 430.

Referring back to FIG. 1, an outer rotor 34 is coupled to the second shaft 16 such that the outer rotor 34 rotates synchronously with the second shaft 16. A first air gap 36 separates the outer rotor 34 from the inner rotor 28. A second air gap 38 separates the outer rotor 34 from the surrounding stator 12.

Figure 3:
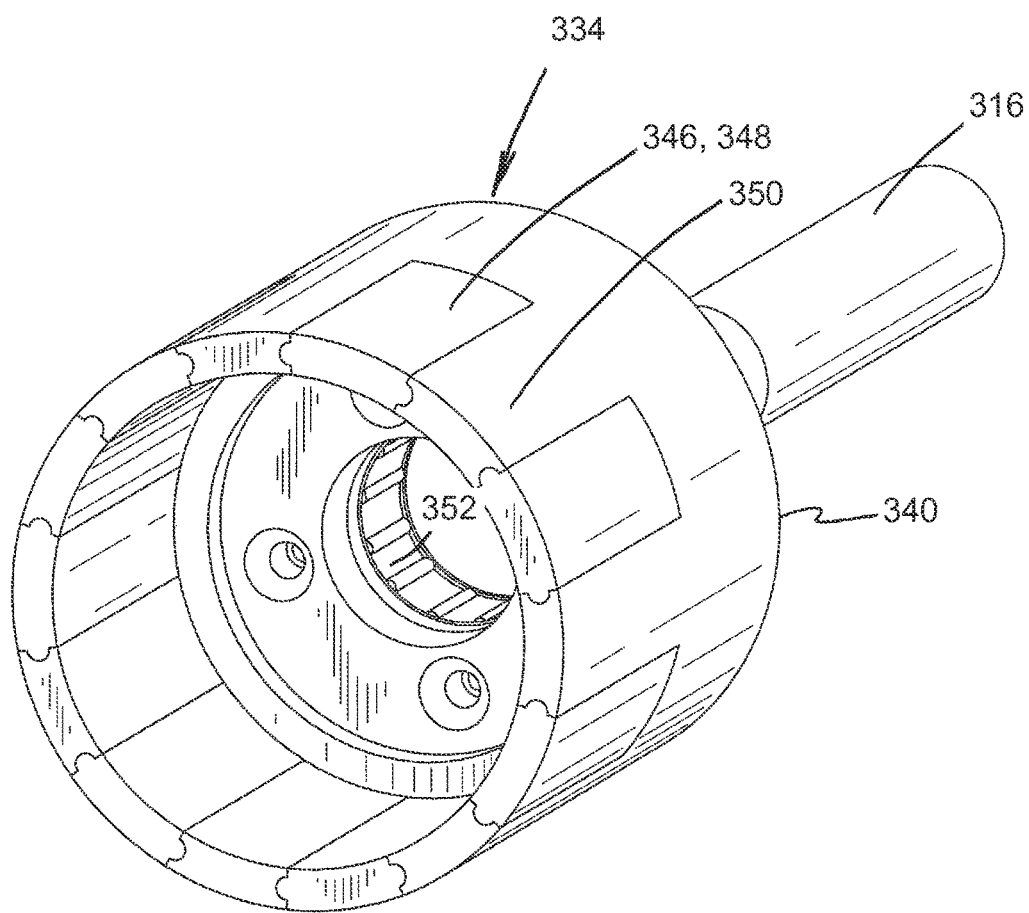
FIG. 3 is a perspective view of a portion of a shaft and outer rotor of an electromagnetic transmission.

The outer rotor 34 includes a base portion 40 coupled to a distal end 42 of the second shaft 16. An annular rotor body 44 extends axially from the base portion 40. FIG. 3 illustrates an outer rotor 334 with many of the features of the rotor 34. As shown in the rotor 334, a rotor body 344 includes radially arranged ferromagnetic pole portions 346. The ferromagnetic pole portions 346 form teeth, or castellations 348, captured between non-magnetic portions 350. This castellated ferromagnetic structure modulates a magnetic flux from the permanent magnets 30 or 430 (FIG. 4) of the inner rotor 28 or 428. Each of the ferromagnetic pole portions 346 may be formed as a stack of ferromagnetic laminations or may be formed unitarily.

Referring back to FIG. 1, the electromagnetic transmission 10 has at least a first operating mode and a second operating mode. In a first operating mode, the DC power supply switch is open. If an external torque is applied to either the first shaft 14 or the second shaft 16, that shaft will rotate substantially freely of the other shaft, with only minimal magnetic braking effects due to the permanent magnets 30 of the inner rotor 28. In this first operating mode, substantial transmission of power from the first shaft 14 to the second shaft 16, or from the second shaft 16 to the first shaft 14 will not occur.

Figure 6:
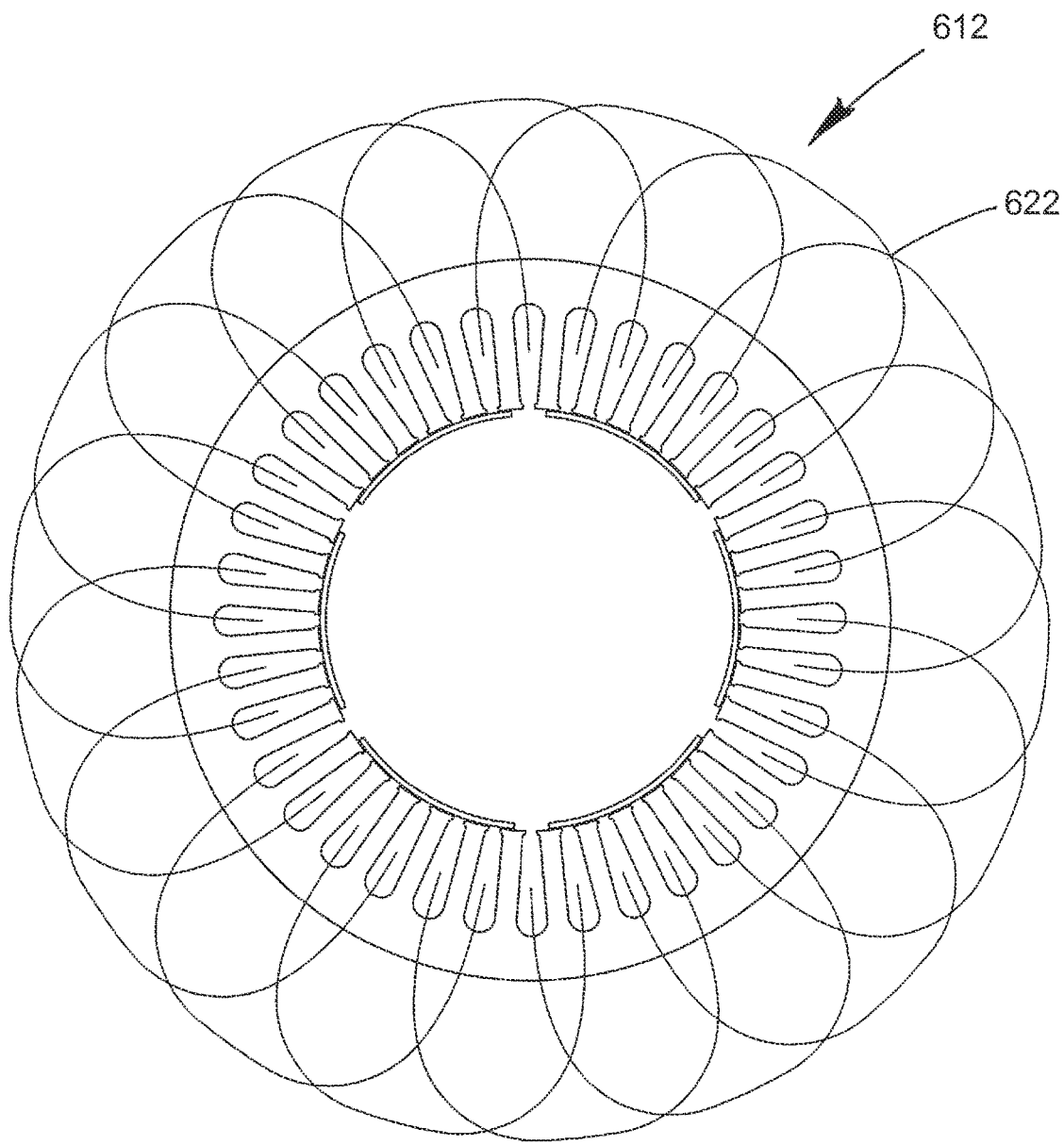
FIG. 6 is top view of a distributed winding stator.
Figure 7:
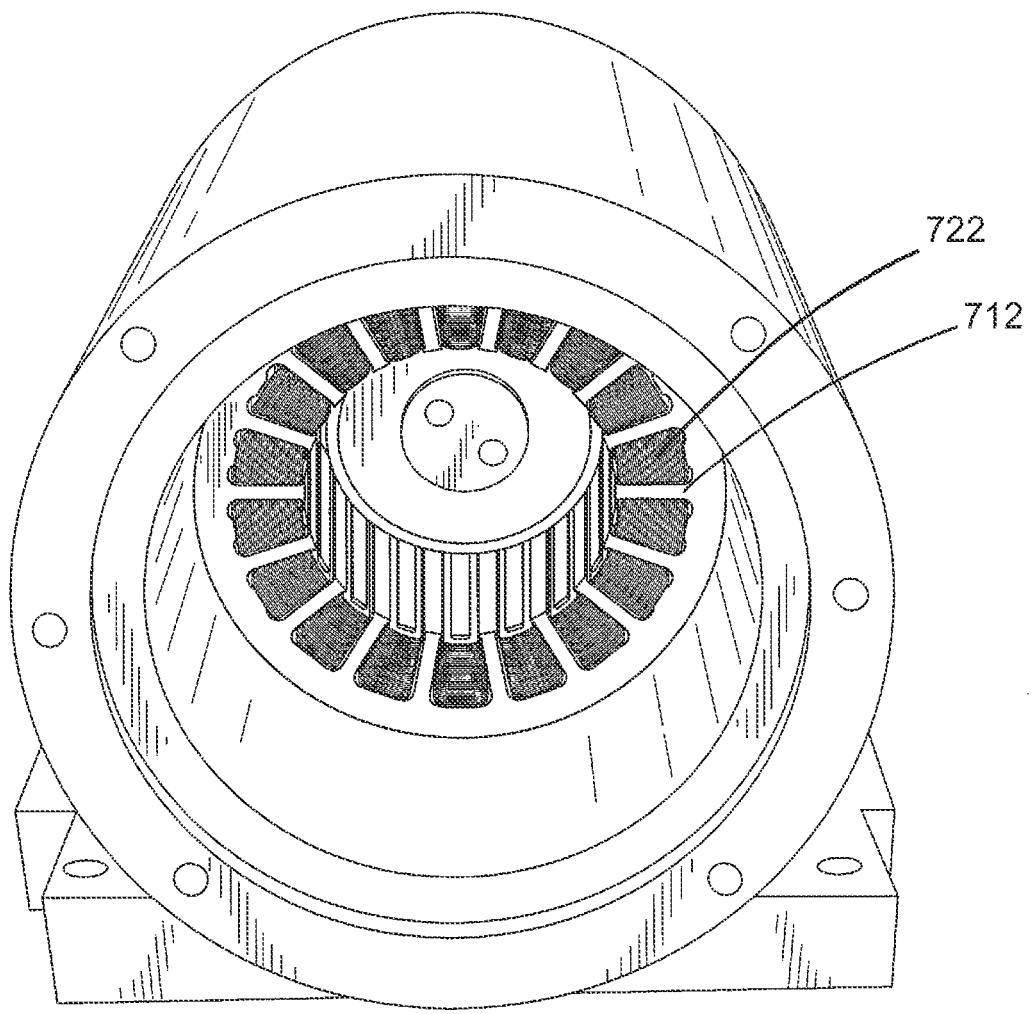
FIG. 7 is a perspective view of a concentrated winding stator.

In the second operating mode, the DC power supply switch 26 is closed such that current from the DC power supply 24 is supplied to the stator windings 22. A current flowing into the stator windings 22 creates a number of fixed electromagnetic poles, where the number of poles depends upon the particular winding structure. FIGS. 6 and 7 illustrate two examples of stator winding structures. The stator winding 22 in the embodiment of FIG. 1 or any of the embodiments discussed below may use a distributed or concentrated layout. FIG. 6 illustrates an example of a six-pole stator 612 with distributed winding 622. FIG. 7 illustrates an example of a twelve-pole stator 712 with concentrated windings 722.

Due to magnetic coupling between the inner rotor 28 and the outer rotor 34, rotating the first shaft 14 by the application of an external torque results in rotation on the second shaft 16. Alternatively, rotating the second shaft 16 results in rotation of the first shaft 14. A torque relationship between rotational speed of the first shaft 14 and the second shaft 16 is determined by the number of permanent magnets 30 on the inner rotor 28, the number of ferromagnetic pole portions 346 (FIG. 3) on the outer rotor 34, and the pattern of the stator windings 22. A gearing ratio $G_r$ is determined by the number $n_s$ of ferromagnetic pole portions 346 on the outer rotor 34 divided by the number of pole pairs p of the permanent magnet the inner rotor 28:

$$G_r = n_s/p$$

A preferred number of stator pole pairs is equal to the absolute value of the difference of the number of castellations and the number of inner rotor magnetic pole pairs.

Figure 2:
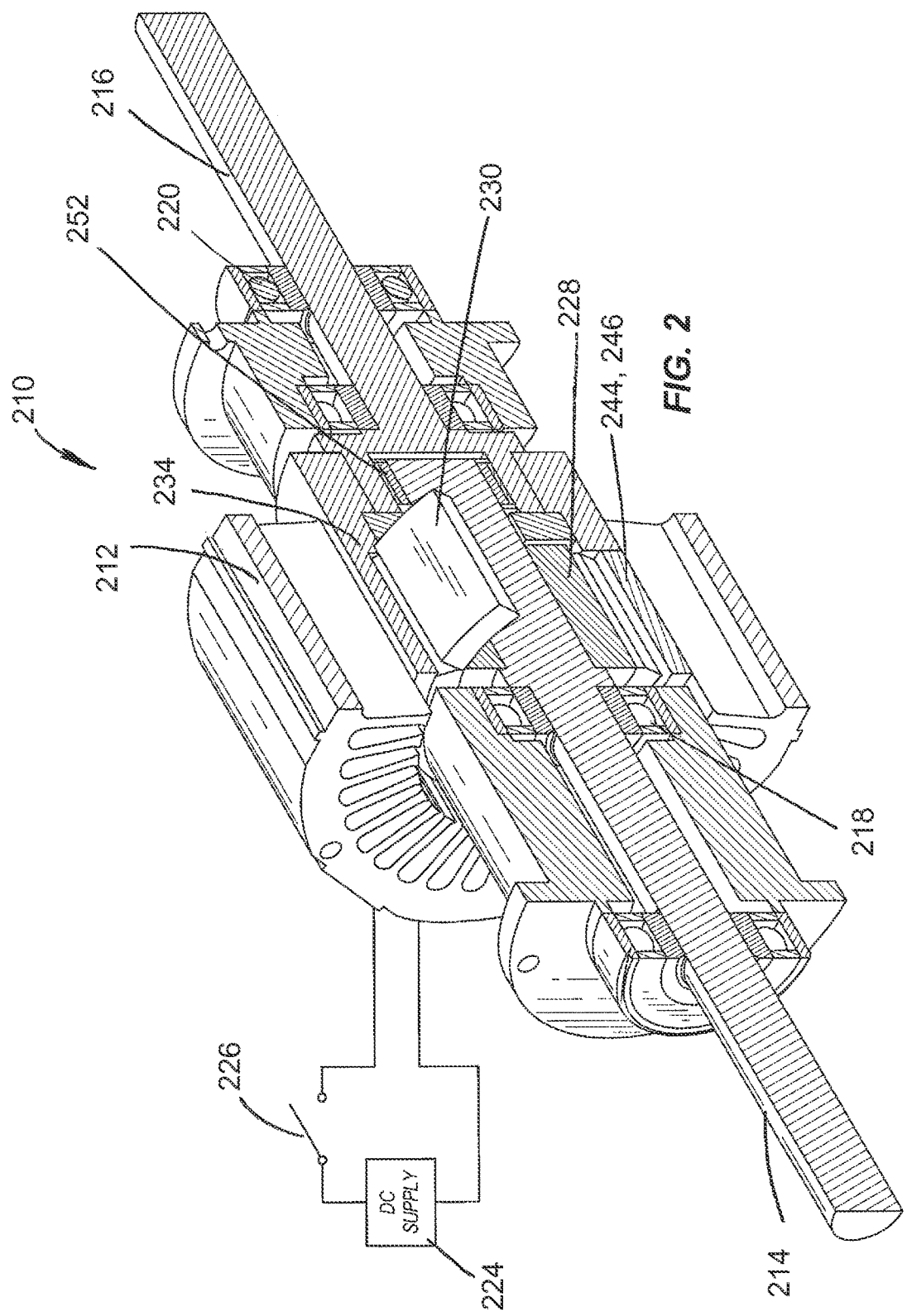
FIG. 2 is a cross-sectional perspective view of an electromagnetic transmission according to a second aspect of the invention.

FIG. 2 illustrates a second embodiment of an electromagnetic transmission 210. The electromagnetic transmission 210 has a number of similarities to the electromagnetic transmission of FIG. 1, and similar components and features have been given similar reference numerals with a "2"-prefix. The electromagnetic transmission 210 includes the addition of a unidirectional mechanical transmission coupling device 252 for mechanically coupling an inner rotor 228 and an outer rotor 234. The unidirectional mechanical coupling device 252 may be, for example, a drawn cup roller bearing 352, as illustrated with the outer rotor 334 of FIG. 3. The unidirectional mechanical coupling device 252 allows free rotation in one direction (a disengaged operating mode) and transmits torque in the opposite direction (an engaged operating mode).

The electromagnetic transmission 210 of FIG. 2 has four modes of operation. In a first mode of operation, a DC power supply switch 226 is open and the unidirectional mechanical coupling device 252 is disengaged. The inner rotor 228 and the outer rotor 234 may rotate independently of each other and there is substantially no power transfer between the first shaft 214 and the second shaft 216 except for minor magnetic braking torque.

In a second mode of operation, the DC power supply switch 226 is open and the unidirectional mechanical coupling device 252 is engaged. In the second mode, the first shaft 214 and the second shaft 216 rotate synchronously in a first direction of rotation with a minimal power loss due to magnetic braking effects. However, because the coupling device 252 is unidirectional, in a second direction of rotation of the second shaft 216 there is substantially no power transmission to the first shaft 214.

In a third mode of operation, the DC power supply switch 226 is shut and the unidirectional mechanical coupling device 252 is disengaged. Rotation on one of the first shaft 214 and the outer shaft 216 results in rotation of the other of the first shaft 214 and the outer shaft 216 by magnetic coupling between the inner rotor 228 and the outer rotor 234. A ratio of the speed between the first shaft 214 and the second shaft 216 is determined by the number of inner rotor permanent magnets 230, the number of ferromagnetic pole portions 246, and the number of stator winding poles.

In a fourth mode of operation, the DC power supply switch 226 is shut and the unidirectional mechanical transmission 252 device is engaged. In this fourth mode of operation, the first shaft and the second shaft rotate substantially synchronously, though additional braking torque may be present compared to the second mode of operation.

Figure 5:
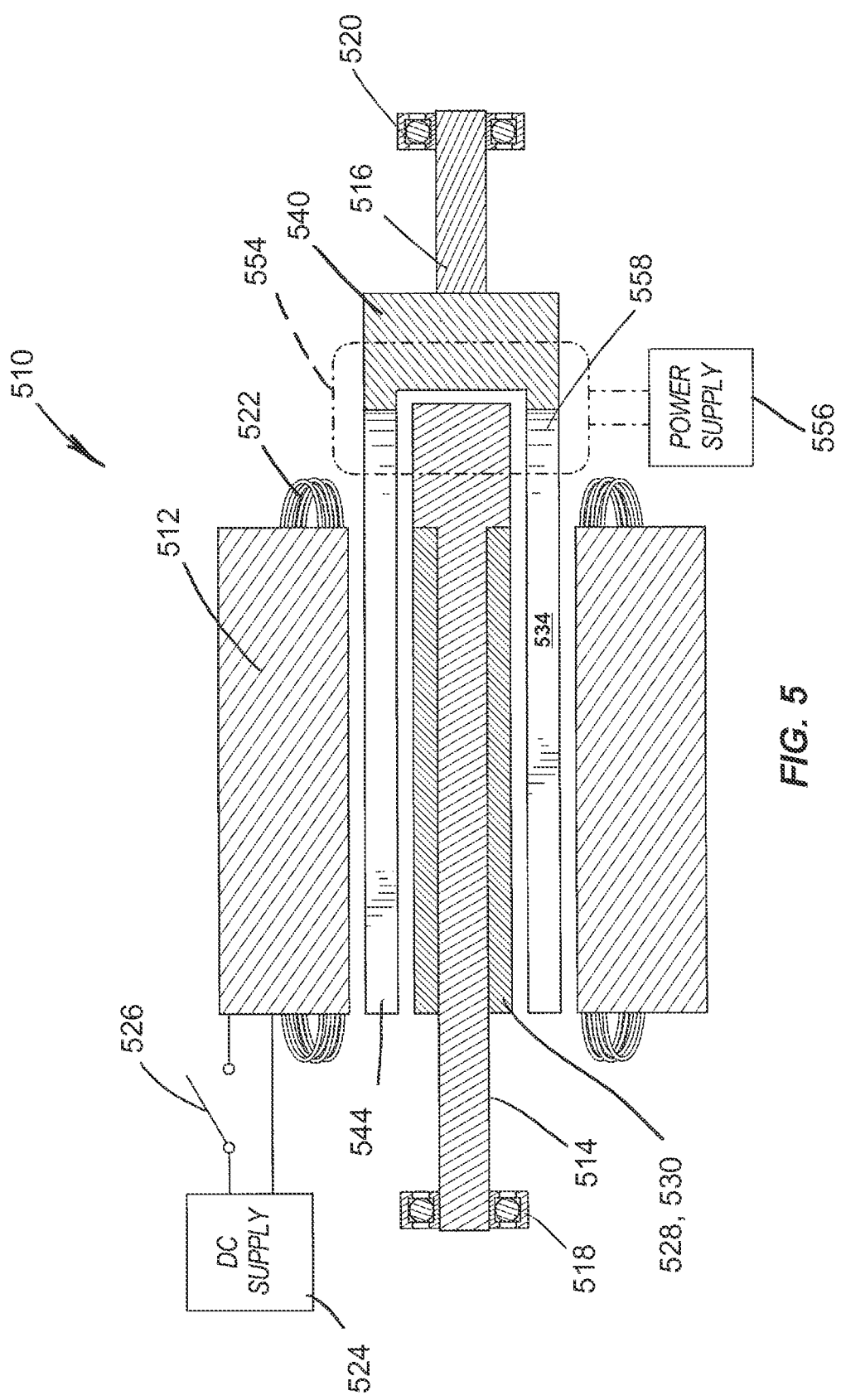
FIG. 5 is a cross-sectional view of an electromagnetic transmission according to a third aspect of the invention.

FIG. 5 illustrates an electromagnetic transmission 510 according to yet another aspect of the invention. The electromagnetic transmission 510 has a number of similarities to the electromagnetic transmission of FIG. 1, and similar components and features have been given similar reference numerals with a "5"-prefix. The electromagnetic transmission of FIG. 5 includes an electromagnetic coupler 554 for coupling an inner rotor 528 and an outer rotor 534 for synchronous rotation. The electromagnetic coupler 554 includes a coupler power supply 556 for selectively supplying current to electromagnetic portions 558 of the outer rotor 534. Although the coupler power supply 556 is illustrated as separate from a DC power supply 524 for the stator windings 522, the stator windings 522 and electromagnetic coupler 554 may be powered from a common power supply, with independent switching.

In a first mode of operation, a DC power supply switch 526 is open, and the electromagnetic coupler 554 is disengaged (i.e., deenergized). The first shaft 514 and the second shaft 516 rotate substantially freely and independently of each other, with the exception of magnetic braking forces caused by permanent magnets 530 of the inner rotor 528.

In a second mode of operation, the DC power supply switch 526 is also open, but the electromagnetic coupler 554 is engaged via the coupler power supply 556. In this second mode, the first shaft 514 and the second shaft 516 rotate substantially synchronously. Power and torque are transmitted from the first shaft 514 to the second shaft 516 or vice versa.

In a third mode of operation, the DC power supply switch 526 is shut and the electromagnetic coupler 554 is disengaged (i.e., deenergized). The first shaft 514 and the second shaft 516 rotate with a speed ratio determined by the number of inner rotor permanent magnets 530, the number of ferromagnetic pole portions (346, see FIG. 3) on the outer rotor 534, and the number of stator winding 522 poles.

In a fourth mode of operation, the DC power supply switch 526 is shut and the electromagnetic coupler 554 is engaged via the power supply 556. In this fourth mode of operation, the first shaft 514 and the second shaft 516 rotate substantially synchronously, though additional braking torque may be present compared to the second mode of operation.

Each of the previously described aspects of the invention may use a variety of stator core laminations and windings. In one arrangement, the number of stator magnetic poles equals the absolute value of the difference of the number of castellations and inner rotor magnetic poles.

Figure 8:
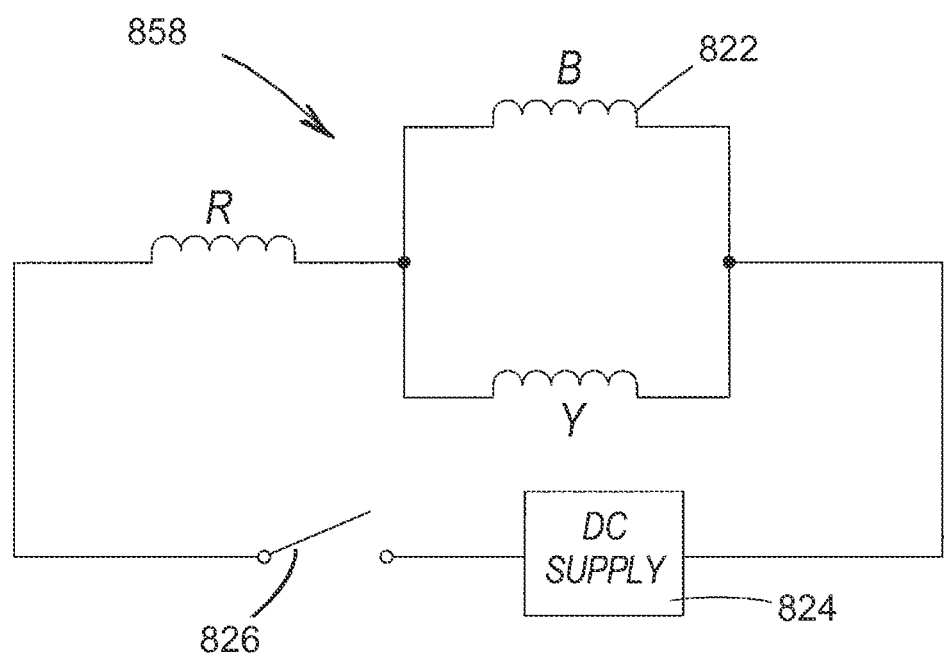
FIG. 8 is a schematic illustration of stator windings connected to a DC power supply.

FIG. 8 illustrates an example of phase winding connections 858 between the stator windings 822 and a DC power supply 824 for an electromagnetic transmission. As illustrated in FIG. 8, parallel windings B and Y are in series with winding R.

Figure 9:
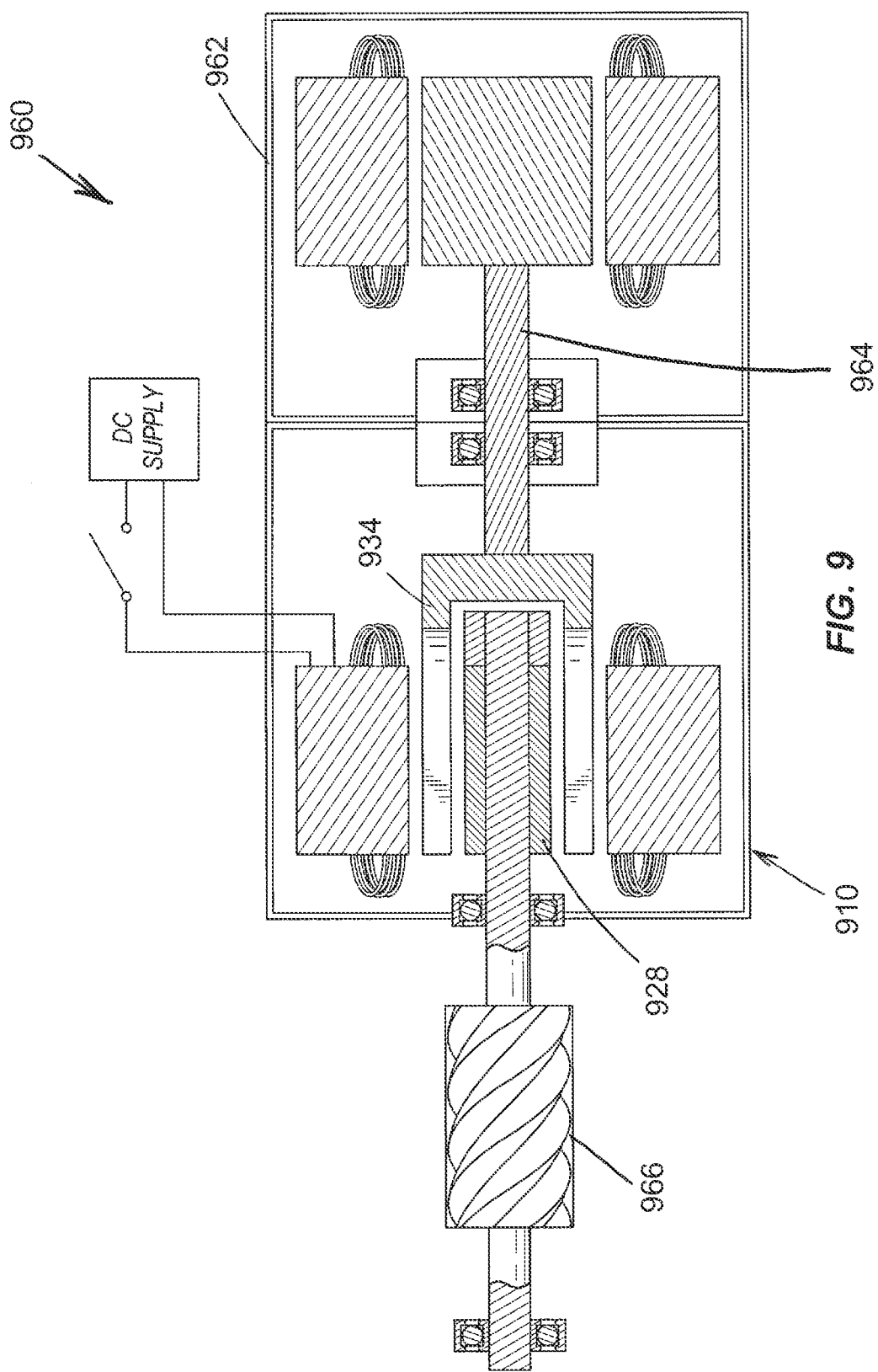
FIG. 9 is a cross-sectional view of a motor, electromagnetic transmission, and compressor combination.

FIG. 9 illustrates an exemplary prime mover/transmission/load system 960 using an electromagnetic transmission 910. In the illustrated system the prime mover is an electric motor 962, and may be any known type of AC or DC motor, including switch reluctance types. Alternatively, a diesel, gasoline, LPG, or CNG internal combustion engine, gas turbine, or other non-electrical prime mover may be used. An output shaft 964 of the prime mover is coupled to an outer rotor 934 of the electromagnetic transmission 910. A load, in this case a screw compressor 966, is coupled to an inner rotor 928. The electromagnetic transmission 910 allows for a desired speed ratio (i.e., a reduction) between the prime mover and the load, but has the aforementioned advantages of overload protection and reduced mechanical friction losses.

Figure 10:
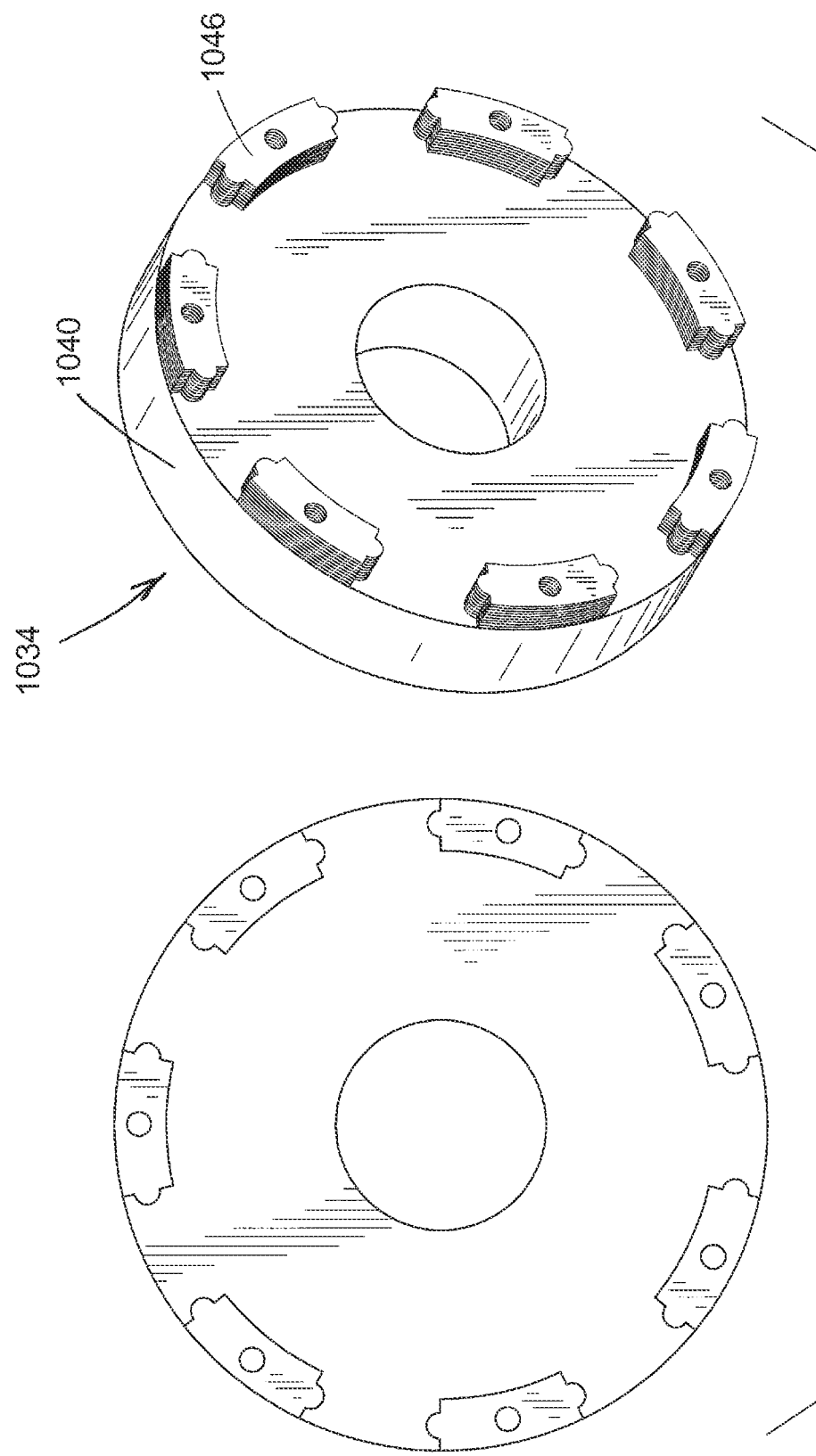
FIG. 10 is a perspective view of a castellated rotor construction according to yet another aspect of the invention.

FIG. 10 illustrates an alternative configuration of a castellated outer rotor 1034. In the castellated outer rotor 1034, ferromagnetic portions 1046 extend distally from a non-magnetic base portion 1040. Unlike the outer rotor illustrated in FIG. 3, the outer rotor does not have non-magnetic material surrounding the ferromagnetic portions 1046. Instead, the ferromagnetic portions 1046 form teeth that are separated by air.

Thus, the invention provides, among other things, an electromagnetic transmission. Various features and advantages of the invention are set forth in the following claims.

What is claimed is:

1. An electromagnetic transmission assembly comprising:
   a stator having a central axis and a plurality of selectively-energized electromagnetic poles;
   a first rotor assembly rotatably supported for rotation about the central axis, the first rotor assembly including a first rotor shaft and a castellated rotor including a plurality of radially arranged ferromagnetic pole portions disposed in a housing;
   a second rotor assembly rotatably supported for rotation about the central axis, the second rotor assembly including a second rotor shaft and a permanent-magnet rotor, wherein the first rotor assembly is at least partially magnetically coupled to the second rotor assembly when the plurality of electromagnetic poles are energized;
   a DC power supply for supplying the electrical current to the stator;
   a switch electrically connected between the stator and the DC power supply to selectively couple DC to the plurality of selectively-energized electromagnetic poles;
   wherein the selectively energizing the electromagnetic poles with the DC power supply creates a magnetic field at least partially coupling the first rotor assembly and the second rotor assembly; and
   wherein the selectively de-energizing the electromagnetic poles with the DC power supply substantially decouples the first rotor assembly and the second rotor assembly such that the prime mover operates substantially independent of the load.

2. The electromagnetic transmission of claim 1, wherein the castellated rotor includes a base portion coupled to a distal end of the first rotor shaft, and an annular rotor body extending axially from the base portion and including the radially arranged ferromagnetic pole portions, the base portion and annular rotor body defining a rotor cavity.

3. The electromagnetic transmission of claim 2, wherein the permanent magnet rotor is at least partially disposed within the cavity.

4. The electromagnetic transmission assembly of claim 1, wherein the DC power supply is a battery.

5. The electromagnetic transmission of claim 1, wherein a ratio of a rotational speed of the first rotor assembly and a rotational speed of the second rotor assembly is determined by the number of magnetic poles on the inner shaft, the number of castellations or saliencies on the outer shaft, and the winding pattern of the stator.

6. The electromagnetic transmission of claim 1, further comprising a coupling assembly for coupling the first rotor assembly and the second rotor assembly for substantially synchronous rotation.

7. An electromagnetic transmission assembly comprising:
   a stator having a central axis and a plurality of selectively-energized electromagnetic poles;
   a first rotor assembly rotatably supported for rotation about the central axis, the first rotor assembly including a first rotor shaft and a castellated rotor including a plurality of radially arranged ferromagnetic pole portions disposed in a housing;
   a second rotor assembly rotatably supported for rotation about the central axis, the second rotor assembly including a second rotor shaft and a permanent-magnet rotor, wherein the first rotor assembly is at least partially magnetically coupled to the second rotor assembly when the plurality of electromagnetic poles are energized;
   a DC power supply for supplying the electrical current to the stator;
   further comprising a coupling assembly for coupling the first rotor assembly and the second rotor assembly for substantially synchronous rotation;
   wherein the coupling assembly mechanically couples the first rotor assembly and the second rotor assembly in only a first direction.

8. The electromagnetic transmission of claim 6, wherein the coupling assembly includes a drawn cup roller bearing.

9. The electromagnetic transmission of claim 1, wherein the coupling assembly magnetically couples the first rotor assembly and the second rotor assembly in at least a first direction.

10. A method of selectively coupling a prime mover to a load the method comprising:
    providing an electromagnetic transmission including a stator having a central axis and a plurality of selectively-energized electromagnetic poles, a first rotor assembly rotatably supported for rotation about the central axis, the first rotor assembly including a first rotor shaft and a castellated rotor including a plurality of radially arranged ferromagnetic pole portions disposed in a housing, a second rotor assembly rotatably supported for rotation about the central axis, the second rotor assembly including a second rotor shaft and a rotor with permanent-magnets, coupling a prime mover to one of the inner rotor and the outer rotor;

coupling a load to the other of the inner rotor and the outer rotor;

selectively energizing the electromagnetic poles directly with a DC power source to create a magnetic field at least partially coupling the first rotor assembly and the second rotor assembly;

operating the prime mover and load in asynchronous driving relation; and selectively de-energizing the electromagnetic poles, thereby substantially decoupling the first rotor assembly and the second rotor assembly such that prime mover operates substantially independent of the load.

11. The method of claim 10, wherein the electromagnetic transmission further includes a coupling assembly selectively coupling the first rotor assembly and the second rotor assembly for substantially synchronous rotation, and wherein the method further comprises selectively engaging the coupling assembly and operating the prime mover and load in substantially synchronous driving relation.

12. The method of claim 10, wherein the prime mover is an electric motor.

13. The method of claim 10, wherein the prime mover is an internal combustion engine.

14. The method of claim 10, wherein the prime mover is a gas turbine.

15. The method of claim 10, wherein the load is a pump.

16. The method of claim 10, wherein the load is a compressor.

17. The method of claim 11, wherein the coupling assembly includes a drawn cup roller bearing.

18. The method of claim 11, wherein a ratio of a rotational speed of the prime mover and a rotational speed of the load is at least partially determined by the number of magnetic poles on the inner shaft, the number of castellations on the outer shaft, and the winding pattern of the stator.

19. A method of selectively coupling a prime mover to a load the method comprising:

providing an electromagnetic transmission including a stator having a central axis and a plurality of selectively-energized electromagnetic poles, a first rotor assembly rotatably supported for rotation about the central axis, the first rotor assembly including a first rotor shaft and a castellated rotor including a plurality of radially arranged ferromagnetic pole portions disposed in a housing, a second rotor assembly rotatably supported for rotation about the central axis, the second rotor assembly including a second rotor shaft and a rotor with permanent-magnets, coupling a prime mover to one of the inner rotor and the outer rotor;

coupling a load to the other of the inner rotor and the outer rotor;

selectively energizing the electromagnetic poles directly with a DC power source to create a magnetic field at least partially coupling the first rotor assembly and the second rotor assembly;

operating the prime mover and load in asynchronous driving relation; and selectively de-energizing the electromagnetic poles, thereby substantially decoupling the first rotor assembly and the second rotor assembly such that prime mover operates substantially independent of the load;

wherein the electromagnetic transmission further includes a coupling assembly selectively coupling the first rotor assembly and the second rotor assembly for substantially synchronous rotation;

wherein the method further comprises selectively engaging the coupling assembly and operating the prime mover and load in substantially synchronous driving relation; and wherein the coupling assembly mechanically couples the first rotor assembly and the second rotor assembly in only a first direction.

* * * * *